US012643502B1

(12) United States Patent
Wang et al.

(10) Patent No.: US 12,643,502 B1
(45) Date of Patent: Jun. 2, 2026

(54) SYSTEM AND METHOD FOR AUTOMATED PANIC BUTTON AND VEHICLE IMMOBILIZER

(71) Applicant: Samsara Inc., San Francisco, CA (US)

(72) Inventors: Jing Wang, Toronto (CA); Narendran Rajan, San Diego, CA (US); William Evan Welbourne, Seattle, WA (US)

(73) Assignee: Samsara Inc., San Francisco, CA (US)

( * ) Notice: Subject to any disclaimer, the term of this patent is extended or adjusted under 35 U.S.C. 154(b) by 523 days.

(21) Appl. No.: 18/056,439

(22) Filed: Nov. 17, 2022

(51) Int. Cl.
| | |
|---|---|
| *G06V 20/59* | (2022.01) |
| *B60R 25/01* | (2013.01) |
| *B60R 25/30* | (2013.01) |
| *B60R 25/31* | (2013.01) |
| *G06V 20/52* | (2022.01) |

(Continued)

(52) U.S. Cl.
CPC ............ *B60R 25/305* (2013.01); *B60R 25/31* (2013.01); *G06V 20/52* (2022.01); *G06V 20/59* (2022.01); *G06V 40/166* (2022.01); *G06V 40/172* (2022.01); *G06V 40/20* (2022.01); *B60R 25/01* (2013.01)

(58) Field of Classification Search
CPC ........ B60R 25/31; B60R 25/01; G06V 20/52; G06V 20/59
See application file for complete search history.

(56) References Cited

U.S. PATENT DOCUMENTS

| | | | |
|---|---|---|---|
| 10,850,709 B1 * | 12/2020 | Nagata | B60R 25/241 |
| 2006/0190419 A1 * | 8/2006 | Bunn | G06V 20/52 |
| | | | 706/2 |

(Continued)

FOREIGN PATENT DOCUMENTS

| | | | | |
|---|---|---|---|---|
| AU | 2020101134 A4 * | 7/2020 | | |
| CN | 107933471 B * | 12/2019 | ............... | B60Q 9/00 |

(Continued)

OTHER PUBLICATIONS

Derman, Ekberjan, and Albert Ali Salah. "Continuous real-time vehicle driver authentication using convolutional neural network based face recognition." 2018 13th IEEE International Conference on Automatic Face & Gesture Recognition (FG 2018). IEEE, 2018. (Year: 2018).*

(Continued)

*Primary Examiner* — Michael Robert Cammarata
(74) *Attorney, Agent, or Firm* — Nicholson, De Vos, Webster & Elliott, LLP

(57) ABSTRACT

A method performed by an edge device (e.g., a dash camera) is disclosed to automatically trigger a security action. The method includes storing a face embedding of a first person that is expected to be inside a vehicle, capturing, using one or more cameras, one or more images of a face of a second person inside the vehicle, generating a face embedding of the second person based on analyzing the one or more images of the face of the second person using a face embedding machine learning model, determining whether the face of the second person matches a face of the first person based on comparing the face embedding of the second person to the face embedding of the first person using a face verification machine learning model, and triggering a security action in response to determining that the faces do not match.

17 Claims, 8 Drawing Sheets

(51) Int. Cl.
   *G06V 40/16*          (2022.01)
   *G06V 40/20*          (2022.01)

(56)                References Cited

U.S. PATENT DOCUMENTS

| | | | |
|---|---|---|---|
| 2012/0242469 A1* | 9/2012 | Morgan | B60K 28/063 |
| | | | 340/426.11 |
| 2016/0098870 A1* | 4/2016 | Bergerhoff | H04W 4/48 |
| | | | 340/5.61 |
| 2018/0290621 A1* | 10/2018 | Seaman | G06Q 50/40 |
| 2019/0278976 A1* | 9/2019 | Khadloya | G08B 13/19656 |
| 2020/0086881 A1* | 3/2020 | Abendroth | G10L 17/00 |
| 2020/0130771 A1 | 4/2020 | Jacobsz Rosier et al. |
| 2020/0193368 A1* | 6/2020 | Bhatia | H04W 4/40 |
| 2021/0001810 A1* | 1/2021 | Rivard | G06V 40/172 |
| 2021/0104159 A1* | 4/2021 | Tsai | G06N 20/00 |
| 2021/0370878 A1* | 12/2021 | Morosawa | B60R 25/2054 |
| 2022/0009447 A1* | 1/2022 | Kleve | H04W 4/029 |
| 2022/0017044 A1* | 1/2022 | Bielby | G06V 10/82 |
| 2022/0261572 A1* | 8/2022 | Shah | G06V 40/162 |
| 2022/0269892 A1* | 8/2022 | Huang | G06V 20/56 |
| 2022/0366738 A1* | 11/2022 | Pabla | G06N 5/02 |
| 2023/0252594 A1* | 8/2023 | Oliveira | G06Q 10/06 |
| | | | 705/13 |
| 2023/0356728 A1* | 11/2023 | Jain | G06F 3/013 |
| 2023/0391290 A1* | 12/2023 | Gaither | B60R 25/10 |

| | | | |
|---|---|---|---|
| 2024/0265731 A1* | 8/2024 | Afshar | G06V 10/95 |
| 2025/0016521 A1* | 1/2025 | Williams | G16H 40/67 |
| 2025/0061791 A1* | 2/2025 | Baker, Jr. | G08B 21/0277 |

FOREIGN PATENT DOCUMENTS

| | | | | |
|---|---|---|---|---|
| CN | 114202677 A | * | 3/2022 | B60R 25/25 |
| JP | 2020510420 A | * | 4/2020 | |
| WO | WO-2017097096 A1 | * | 6/2017 | B60R 25/1006 |
| WO | WO-2021059657 A1 | * | 4/2021 | B60R 25/25 |

OTHER PUBLICATIONS

Schroff, Florian, Dmitry Kalenichenko, and James Philbin. "Facenet: A unified embedding for face recognition and clustering." Proceedings of the IEEE conference on computer vision and pattern recognition. 2015. (Year: 2015).*

X. Fu, et al., "Intelligent In-Vehicle Safety and Security Monitoring System with Face Recognition," 2019 IEEE Int'l Conf. on Computational Science and Engineering (CSE) and IEEE Int'l Conf on Embedded and Ubiquitous Computing (EUC), New York, NY, USA, 2019, pp. 225-229 (Year: 2019).*

T. Dang, V. Gupta, D. S. Wadia, p. Kohli and R. K. Chahal, "Facelgnition: An automatic anti-theft and keyless solution for vehicles," 2021 International Conference on Computational Intelligence and Knowledge Economy (ICCIKE), Dubai, United Arab Emirates, 2021, pp. 248-253 (Year: 2021).*

* cited by examiner

SYSTEM AND METHOD FOR AUTOMATED PANIC BUTTON AND VEHICLE IMMOBILIZER

TECHNICAL FIELD

One or more embodiments relate to machine learning on edge devices, and more specifically, to automatically triggering a panic button and/or vehicle immobilizer using machine learning models on edge devices.

BACKGROUND

Organizations that operate/own a fleet of vehicles may use fleet management software to help manage their fleet. Fleet management software can help fleet managers gain real-time visibility into their fleet and support day-to-day operations. A major challenge for fleet managers is keeping drivers safe. Ensuring driver safety can be difficult, particularly when fleet managers are hundreds of miles away from moving vehicles.

A panic button may be installed in a vehicle to allow the driver to alert a fleet manager in the event of an emergency or a high-risk scenario. When pushed/activated, the panic button may cause an alert to be sent to the fleet manager. The alert may include information regarding the current location of the vehicle and/or video footage captured by a dash camera (or "dash cam") installed in the vehicle (e.g., if the panic button is integrated with a dash cam or can otherwise communicate with the dash cam) to help the fleet manager determine the appropriate actions to take to assist the driver. The alert may be sent to the fleet manager via email, text message, an application programming interface (API), and/or fleet management software.

A vehicle immobilizer may be installed in a vehicle to allow the driver and/or a fleet manager to immobilize the vehicle in the event of an emergency or high-risk scenario. The driver may activate the vehicle immobilizer by pressing a button located inside the vehicle (e.g., a panic button or a separate immobilization button). A fleet manager may remotely activate the vehicle immobilizer using fleet management software. When activated, the vehicle immobilizer may disable the ignition and/or the accelerator of the vehicle to prevent the vehicle from starting up and/or moving. A vehicle immobilizer may be useful preventing vehicle theft, recovering stolen assets, and/or managing access to vehicles.

Panic buttons and vehicle immobilizers rely on a human operator for activation. However, there can be situations where the human operator is not able to access and activate a panic button and/or a vehicle immobilizer in a timely manner, which may result in vehicle theft, loss of assets (e.g., cargo being carried by the vehicle), and worse yet bodily harm to the driver.

BRIEF DESCRIPTION OF THE DRAWINGS

The following figures use like reference numbers to refer to like elements. Although the following figures depict various example embodiments, alternative embodiments are within the spirit and scope of the appended claims. In the drawings:

DETAILED DESCRIPTION

The following description describes methods, apparatus, and systems that use an artificial intelligence (AI) component installed in an edge device (e.g., a dash camera (also referred to as a "dash cam")) to automatically trigger a security action. The security action may include sending an alert to a cloud (e.g., to alert a fleet manager) and/or activating a vehicle immobilizer. In an embodiment, an edge device uses a face verification machine learning model to determine whether the face of the person currently operating a vehicle (or otherwise occupying the vehicle) matches the face of the person that is expected to be operating (or occupying) the vehicle. Additionally or alternatively, in an embodiment, the edge device captures a video stream and an audio stream of a vehicle (e.g., using an inward facing camera and/or an outward facing camera) and analyzes the video stream and/or the audio stream using one or more machine learning models to determine whether a security incident occurred in relation to the vehicle. For example, the edge device may use an object detection machine learning model to determine whether a weapon (e.g., a gun or a knife) appears in the video stream, use an audio classification machine learning model to determine whether a sound indicative of a security incident (e.g., harsh/abnormal sounds such as the sound of glass breaking, the sound of a gun shot, the sound of screaming, the sound of repeated honking, etc.) is heard in the audio stream, use an automated speech recognition machine learning model to determine whether human language indicative of a security incident (e.g., "please do not hurt me") is heard in the audio stream, and/or use a behavior classification machine learning model to determine whether human behavior indicative of a security incident (e.g., a person holding both of their hands up above their head) appears in the video stream. The edge device may trigger a security action if the face of the person currently operating a vehicle does not match the face of the person that is expected to be operating the vehicle and/or detects that a security incident has occurred in relation to the vehicle. Various embodiments are now described with reference to the accompanying figures.

Figure 1:
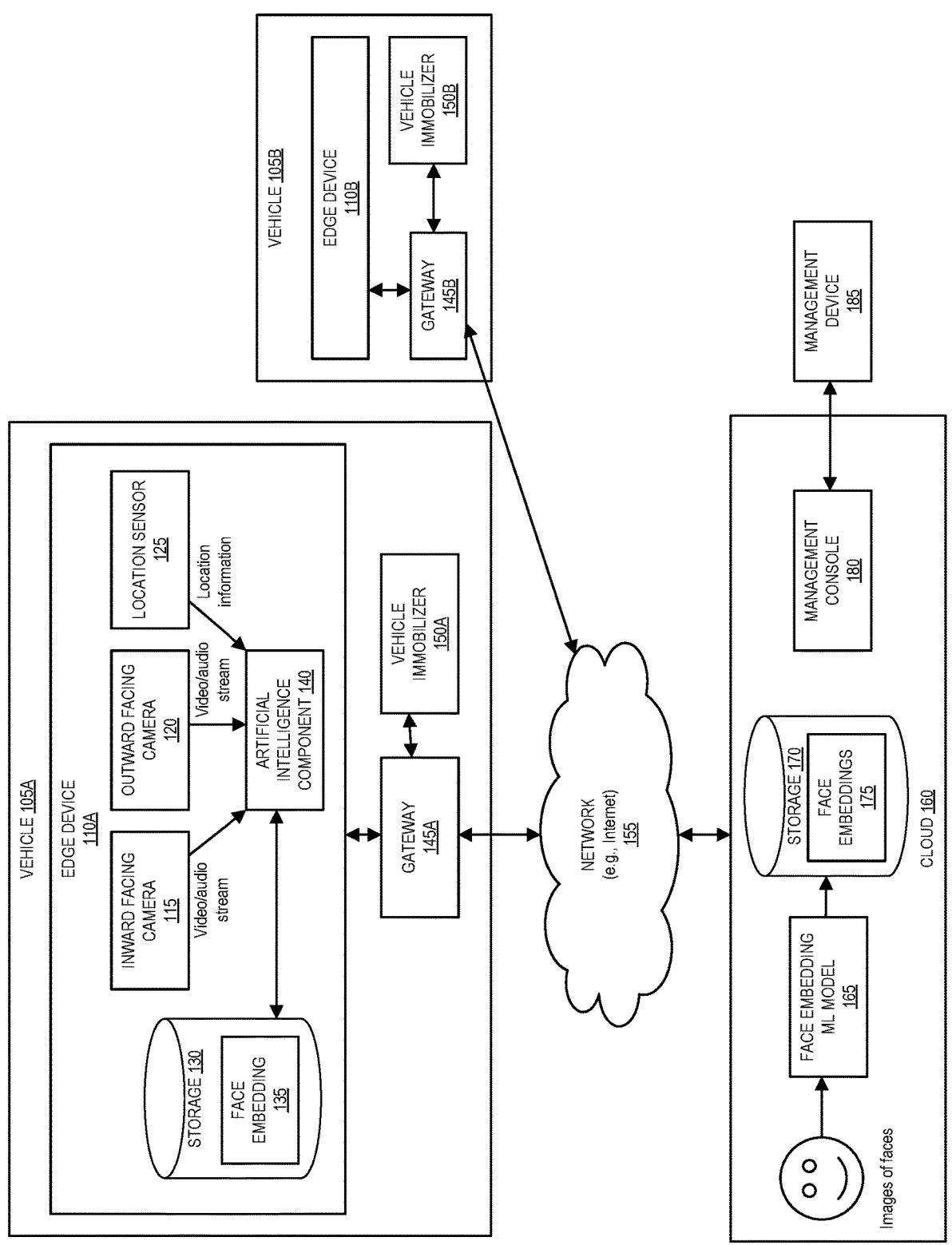
FIG. 1 is a diagram showing an environment in which an edge device can leverage artificial intelligence to automatically trigger a security action, according to some embodiments.

FIG. 1 is a diagram showing an environment in which an edge device can leverage artificial intelligence to automatically trigger a security action, according to some embodiments. As shown in the diagram, the environment includes vehicle 105A, vehicle 105B, a network 155, a cloud 160, and a management device 185.

Vehicle 105A may include an edge device 110A, a gateway 145A, and a vehicle immobilizer 150A. Edge device 110A may be an electronic device that uses sensors, computer vision, and/or artificial intelligence to collect and process information and that can communicate with the cloud over the network 155 (e.g., via gateway 145A). In an embodiment, edge device 110A is a dash cam. Edge device 110A is described in further detail herein below.

The network 155 may be any type of network that allows devices to communicate with each other. For example, the network 155 may be the internet, a cellular network (e.g., a Fifth Generation (5G) or Fourth Generation (4G) Long Term Evolution (LTE) network), a wide area network (WAN), a local area network (LAN), or any combination thereof. Although the network 155 is illustrated in the diagram as a single network, it should be appreciated that it may include a variety of types of networks.

Gateway 140A may be an electronic device that is communicatively situated between the edge device 110A and the cloud 160. Gateway 140A may establish a connection with edge device 110A and vehicle immobilizer 150A. The connection between gateway 140A and edge device 110A may be a wired connection, a wireless connection, or a combination of both. Similarly, the connection between gateway 140A and vehicle immobilizer 150A may be a wired connection, a wireless connection, or a combination of both. Gateway 140A may also establish a connection with the cloud 160 over the network 155. In an embodiment, the connection between gateway 140A and the cloud 160 includes a cellular (e.g., 5G or LTE) connection. Gateway 140A may facilitate communications between devices installed in vehicle 105A (e.g., edge device 110A and vehicle immobilizer 150A) and the cloud 160. In an embodiment, edge device 110A communicates directly with the cloud 160 without going through gateway 140A (e.g., if edge device 110A has a communication interface (e.g., a cellular interface) that allows it to communicate directly with the cloud 160).

Vehicle immobilizer 150A may be an electronic device that can be activated to immobilize vehicle 105A. When activated, vehicle immobilizer 150A may disable the ignition and/or the accelerator of vehicle 105A to prevent vehicle 105A from starting up and/or moving. Vehicle immobilizer 150A may be locally activated by the driver (or another occupant) of vehicle 105A (e.g., by pushing a button that is integrated with or linked to vehicle immobilizer 150A) or remotely activated over the network 155 (e.g., a remotely located fleet manager may use fleet management software to send a signal to vehicle immobilizer 150A over the network 155 to immobilize vehicle 105A).

As shown in the diagram, edge device 110A includes an inward facing camera 115, an outward facing camera 120, a location sensor 125, a local storage 130, and an artificial intelligence component 140.

The inward facing camera 115 may be a camera facing the inside of vehicle 105A to capture a video stream showing a view of the cabin of vehicle 105A. The outward facing camera 120 may be a camera facing away from vehicle 105A to capture a video stream showing a view facing outwards from vehicle 105A. In addition to capturing a video stream, the inward facing camera 115 and/or the outward facing camera 120 may also capture an audio stream (e.g., using a built-in microphone). While the diagram shows an embodiment of an edge device 110A that has two cameras, some edge devices may have a single camera or more than two cameras. The cameras may provide the video stream and audio stream they capture to the artificial intelligence component 140 for analysis.

The location sensor 125 may be an electronic device that can determine the location of vehicle 105A. In an embodiment, the location sensor 125 is a GPS sensor that uses GPS technology to determine the location (e.g., latitude and longitude) of vehicle 105A and possibly other information such as timing information. In an embodiment, the location sensor 125 uses Wi-Fi Positioning System (WPS) technology to determine the location of vehicle 105A. The location sensor 125 may generate location information indicating the current location of vehicle 105A and provide the location information to the artificial intelligence component 140.

As will be described in further detail herein, the artificial intelligence component 140 may analyze the video stream and/or the audio stream captured by the cameras of edge device 110A using machine learning models to verify the identity of the person inside vehicle 105A and/or to detect when a security incident has occurred in relation to vehicle 105A. If the artificial intelligence component 140 is not able to verify the identity of the person inside vehicle 105A and/or the artificial intelligence component 140 determines that a security incident has occurred in relation to vehicle 105A, the artificial intelligence component 140 may trigger a security action. The security action may include sending an alert to the cloud 160 (e.g., to a fleet manager and/or other personnel) and/or activating the vehicle immobilizer 150A to immobilize vehicle 105A.

The artificial intelligence component 140 may verify the identity of the person inside vehicle 105A using one or more machine learning models. For example, the artificial intelligence component 140 may generate a face embedding of the person inside vehicle 105A based on analyzing one or more images/frames of the face of the person using a face embedding machine learning model. The face embedding may be vector representation of the features extracted from a face. In an embodiment, the face embedding machine learning model is ResNet 18 trained with Arcface loss, although other types of machine learning models may be used. The artificial intelligence component 140 may determine whether the face of the person inside vehicle 105A matches the face of the person that is expected to be inside vehicle 105A based on comparing the face embedding of the person inside vehicle 105A to the face embedding of the person that is expected to be inside vehicle 105A using a face verification machine learning model. In an embodiment, the face verification machine learning model uses cosine distance measurements to determine whether faces match or how closely they match.

In an embodiment, the cloud 160 generates the face embedding 135 of the person that is expected to be inside vehicle 105A and sends this face embedding 135 to edge device 110A over the network 155 (e.g., via gateway 145A). Edge device 110A may store the face embedding 135 received from the cloud 160 in its local storage 130. The artificial intelligence component 140 may obtain the face embedding 135 from the local storage 130, as needed (e.g., when it needs to verify the identity of the person inside vehicle 105A).

The cloud 160 may be a computing platform that executes fleet management software. As shown in the diagram, the cloud 160 includes a management console 180 of the fleet management software. The management console 180 may provide a graphical user interface (GUI) that allows users to interact with the control the fleet management software. A user (e.g., a fleet manager) may use a management device 185 to access the management console 180. The management device 185 may be an electronic device (e.g., laptop, workstation, smartphone, palm top, mobile phone, tablet, etc.) that can connect to the cloud 160 to access the management console 180.

A user of the fleet management software may upload images of the faces of persons that are expected to operate or otherwise occupy the vehicles 105 to the cloud 160 (e.g., using the management console 180). The cloud 160 may generate face embeddings 175 of the persons that are expected to operate/occupy the vehicles 105 based on analyzing the images using the face embedding machine learning model 165. The cloud 160 may store these face embeddings 175 in the cloud storage 170. The cloud 160 may send the face embeddings of the person(s) that is expected to be inside a vehicle 105 to the edge device 110 associated with that vehicle 105. For example, as mentioned above, the cloud 160 may send the face embedding of the person that is expected to be inside vehicle 105A to edge device 110A over the network 155 (e.g., via gateway 145A). Edge device 110A may store this face embedding in its local storage 130 (as face embedding 135) and use this face embedding 135 to verify the identity of the person currently inside vehicle 105A.

In an embodiment, the artificial intelligence component 140 locally generates the face embedding of the person that is expected to be inside vehicle 105A (instead of receiving the face embedding from the cloud 160) and stores the face embedding in the local storage 130. For example, the artificial intelligence component 140 may generate the face embedding of the person that is inside vehicle 105A (e.g., using a locally stored face embedding machine learning model) whenever vehicle 105A enters a predefined geofenced area and store this face embedding in its local storage 130. The predefined geofenced area may be a geographical area in which identity verification is to be performed and/or security actions are to be triggered. For example, the predefined geofenced area may be a geographical area in which vehicle theft is known to commonly occur. A user of the fleet management software may define the predefined geofenced areas (e.g., using the management console 180), as desired. The artificial intelligence component 140 may use the location information it receives from the location sensor 125 to determine when vehicle 105A is within a predefined geofenced area. The artificial intelligence component 140 may verify the identity of the person inside vehicle 105A using the locally generated face embedding 135 while vehicle 105A is within the predefined geofenced area (but not when vehicle 105A is outside of the predefined geofenced area). The assumption here is that the person inside vehicle 105A should not change while vehicle 105A is within the predefined geofenced area. If the artificial intelligence component 140 is unable to verify the identity of the person inside vehicle 105A while vehicle 105A is within the predefined geofenced area, the artificial intelligence component 140 may trigger a security action (e.g., send an alert to the cloud 160 and/or activate vehicle immobilizer 150A). An advantage of locally generating the face embedding of the person that is expected to be inside vehicle 105A is that it does not rely on having a connection to the cloud 160 so identity verification can function even when vehicle 105A loses connection to the cloud 160.

Additionally or alternatively to performing identify verification as described above, the artificial intelligence component 140 may determine whether a security incident has occurred in relation to vehicle 105A based on analyzing the video stream and/or audio stream captured by the cameras (e.g., inward facing camera 115 and/or outward facing camera 120) using one or more machine learning models. For example, the artificial intelligence component 140 may use an object detection machine learning model to determine whether a weapon (e.g., a gun or a knife) appears in the video stream. The appearance of a weapon in the video stream may indicate that a security incident may have occurred. In an embodiment, the object detection machine learning model is a one stage object detection machine learning model (e.g., mobilenet-ssd). As another example, the artificial intelligence component 140 may use an audio classification machine learning model to determine whether a sound indicative of a security incident (e.g., harsh/abnormal sounds such as the sound of glass breaking, the sound of a gun shot, the sound of screaming, sound of repeated honking, etc.) is heard in the audio stream. In an embodiment, the audio classification machine learning model uses audio sampling techniques, a Fast Fourier Transform (FFT), a convolutional neural network, and/or a dense layer to determine whether a particular sound is heard in the audio stream. It should be appreciated that other types of audio classification/analysis techniques can be used to detect certain types of sounds in an audio stream. As another example, the artificial intelligence component may use an automated speech recognition machine learning model to determine whether human language indicative of a security incident (e.g., "please do not hurt me") is heard in the audio stream. In an embodiment, the artificial intelligence component 140 uses an automated speech recognition machine learning model to convert audio to text and then uses a keyword matching algorithm to detect predefined keywords/phrases indicative of a security incident in the text. As another example, the artificial intelligence component 140 may use a behavior classification machine learning model to determine whether human behavior indicative of a security incident (e.g., holding both hands up over the head or behavior associated with someone who is searching for ways to disable communication or recording devices installed in the vehicle) appears in the video stream. The artificial intelligence component 140 may determine whether a security incident has occurred in relation to vehicle 105A based on detecting one or more of the above events.

Thus, the artificial intelligence component 140 may use one or more machine learning models to verify the identify of the person inside vehicle 105A (e.g., by determining whether the face of the person inside vehicle 105A matches the face of a person that is expected to be inside vehicle 105) and/or to determine whether a security incident has occurred in relation to vehicle 105A. The artificial intelligence component 140 may trigger a security action if it is not able to verify the identity of the person inside vehicle 105A and/or determines that a security incident has occurred in relation to vehicle 105A. The security action may include sending an alert to the cloud 160 (e.g., to a user of the fleet management software) and/or activating vehicle immobilizer 150A to immobilize vehicle 105A. The specific action may be determined based on the severity of the situation. For example, if the artificial intelligence component 140 is not able to verify the identity of the person inside vehicle 105A, this is considered a high risk situation (e.g., vehicle theft or a hijacking situation), and thus the artificial intelligence component 140 may cause an alert to be sent to the cloud 160 and vehicle immobilizer 150A to be activated. As another example, if the artificial intelligence component 140 is able to verify the identity of all persons inside vehicle 105A but determines that the sound of honking is heard in the audio stream, then this may be considered to be a relatively lower risk situation, and thus the artificial intelligence component 140 may only cause an alert to be sent to the cloud 160 but not cause vehicle 105A to be immobilized.

In an embodiment, as discussed above, the artificial intelligence component 140 only triggers a security action or certain security actions (e.g., activating a vehicle immobilizer) when vehicle 105A is within a predefined geofenced area (e.g., areas in which vehicle theft is known to occur or an otherwise dangerous area). This may help reduce false positives and avoid unwanted/unsafe situations, for example, where vehicle immobilizer 150A is activated in the middle of a busy highway in a big city during broad daylight.

Vehicle 105B may include similar components as vehicle 105A such as edge device 110B, gateway 145B, and vehicle immobilizer 150B. These components may operate in a similar manner as described above with regard to vehicle 105A but with respect to vehicle 105B to automatically trigger a security action, and thus these components are not described in further detail for sake of conciseness. Vehicle 105B may belong to the same fleet of vehicles as vehicle 105A (and thus managed by the same fleet manager). While for the sake of simplicity the diagram only shows two vehicles 105, it should be appreciated that there can be more than two vehicles 105 in the environment that are managed by fleet management software, with each vehicle having an edge device 110 with an artificial intelligence component 140 that can detect emergency or high risk situations and trigger security actions in response thereto.

Embodiments thus leverage artificial intelligence capabilities built into an edge device to detect emergency or high risk situations and trigger the appropriate security action for the situation. An advantage of embodiments disclosed herein is that they can automatically trigger a security action during emergency or high risk situations without requiring manual human intervention. Embodiments may be particularly useful in situations where a human operator (e.g., a driver or passenger of a vehicle or a remote fleet manager) is not able to initiate the necessary security actions (e.g., push a panic button or activate a vehicle immobilizer) in a timely manner.

Figure 2:
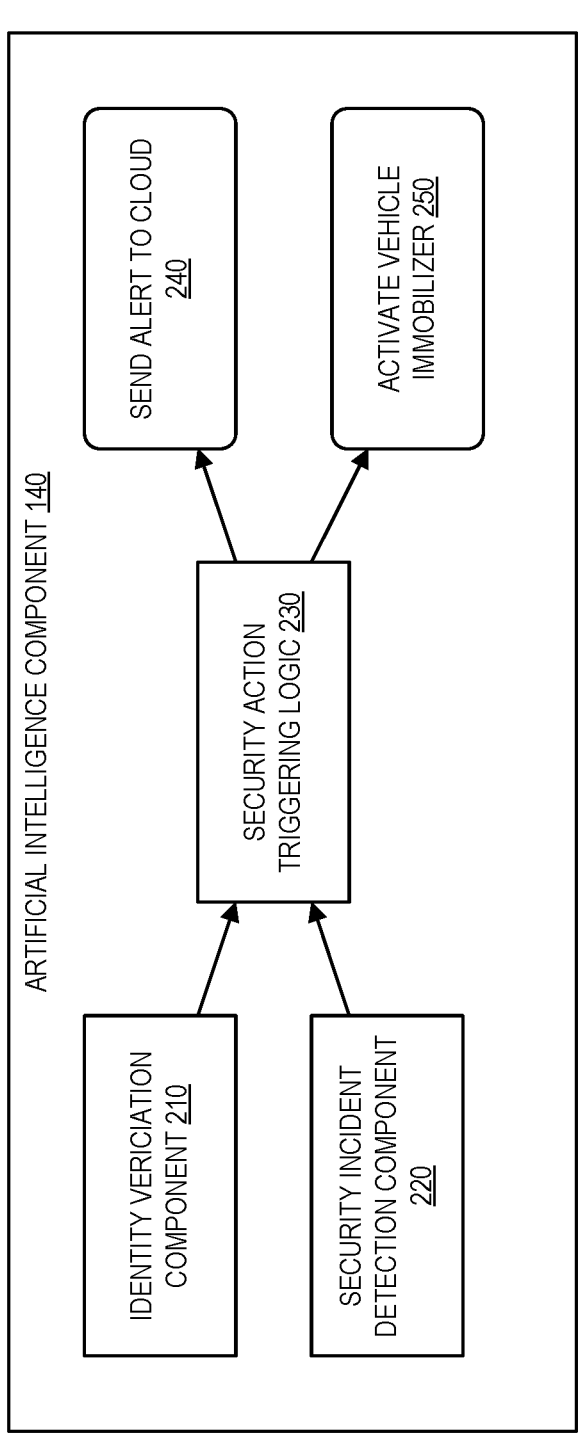
FIG. 2 is a diagram showing the subcomponents of an artificial intelligence component, according to some embodiments.

FIG. 2 is a diagram showing the subcomponents of an artificial intelligence component, according to some embodiments.

As shown in the diagram, the artificial intelligence component 140 includes an identity verification component 210, a security incident detection component 220, and a security action triggering logic 230. The identity verification component 210 may analyze images/frames of a person inside a vehicle using one or more machine learning models to verify the identity of the person inside the vehicle. For example, as described above, the identify verification component 210 may generate a face embedding of the person inside the vehicle based on analyzing the images of the face of the person using a face embedding machine learning model. The identity verification component 210 may then determine whether the face of the person inside the vehicle matches the face of the person that is expected to be inside the vehicle based on comparing the face embedding of the person inside the vehicle to the face embedding of the person that is expected to be inside the vehicle using a face verification machine learning model. The identity verification component 210 may provide an indication of whether the faces match (or an indication of how closely the faces match) to the security action triggering logic 230.

The security incident detection component 220 may analyze a video stream and/or audio stream using one or more machine learning models to detect when a security incident has occurred in relation to a vehicle. For example, as described above, the security incident detection component 220 may use one or more machine learning models to detect weapons appearing in the video stream, detect sounds indicative of a security incident in the audio stream, detect human language indicative of a security incident in the audio stream, and/or to detect human behavior indicative of a security incident appearing in the video stream. The security incident detection component 220 may determine whether a security incident has occurred (or how likely it is that a security incident has occurred) based on detecting such events. The security incident detection component 220 may provide an indication of whether a security incident has occurred (or an indication of how likely it is that a security incident has occurred) to the security action triggering logic 230. Alternatively, the security incident detection component 220 may provide an indication of which objects/language/sounds/behaviors were detected to the security action triggering logic 230.

The security action triggering logic 230 may determine whether a security action should be triggered and what type of security action should be triggered based on the inputs provided by the identity verification component 210 and the security incident detection component 220. As shown in the diagram, the security action may include sending an alert to the cloud (operation 240) and/or activating a vehicle immobilizer (operation 250). It should be appreciated that the security action can include other types of actions. Also, it should be appreciated that the security action triggering logic 230 can use other types of inputs (e.g., location information) to determine when and what type of security action to trigger. The security action triggering logic 230 may determine the specific actions to trigger based on the severity of the situation. It should also be appreciated that the security action triggering logic 230 can be configured (e.g., by a user of the fleet management software), as needed.

Figure 3:
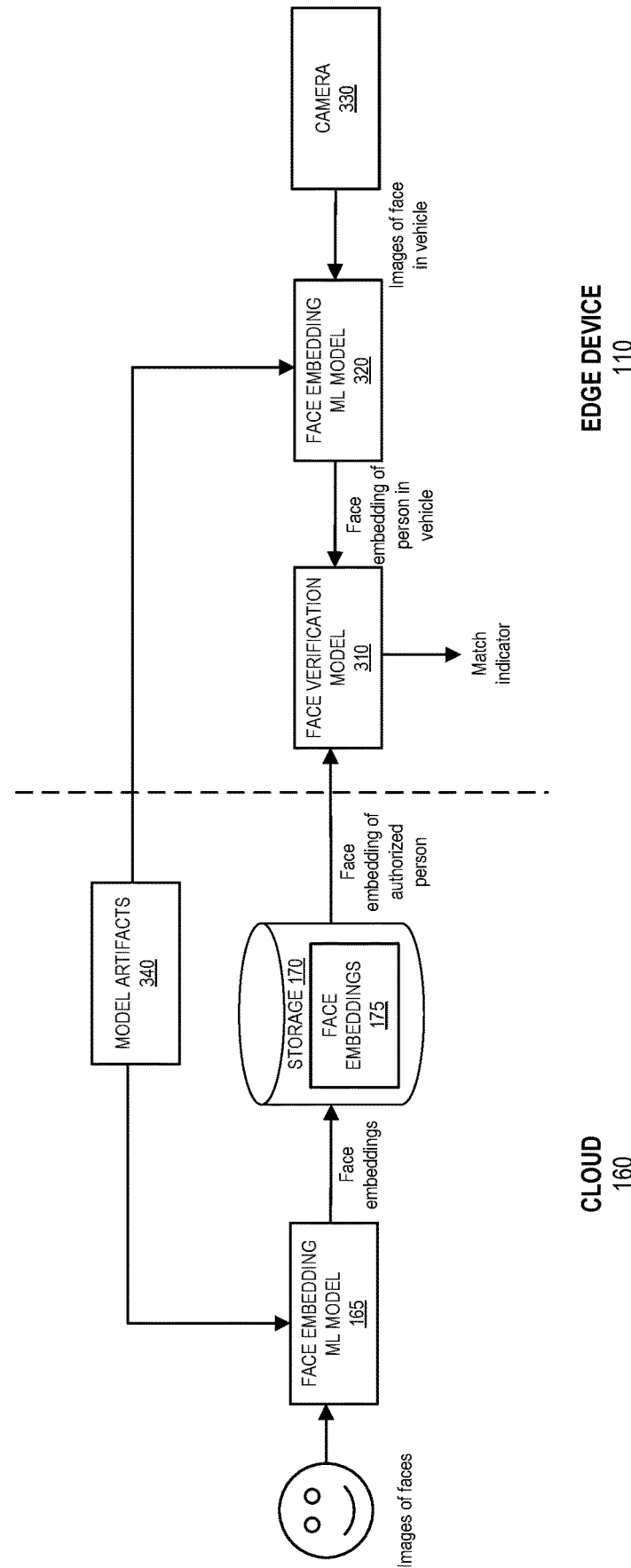
FIG. 3 is a diagram showing components in the cloud and edge device that can be used to perform identity verification, according to some embodiments.

FIG. 3 is a diagram showing components in the cloud and edge device that can be used to perform identity verification, according to some embodiments.

A user of fleet management software (e.g., a fleet manager) may provide images of the faces of authorized persons (e.g., drivers that are hired by the organization managing the fleet) to the cloud 160. The cloud 160 may generate face embeddings 175 of the authorized persons based on analyzing the images using a face embedding machine learning model 165. The cloud 160 may store the generated face embeddings 175 in a cloud storage 170. The cloud 160 may provide the face embedding of an authorized person that is expected to be inside a vehicle to the edge device 110 associated with the vehicle. The edge device 110 may include a camera 330 that captures images/frames of the face of the person inside the vehicle. The edge device 110 may generate a face embedding of the person inside the vehicle based on analyzing the images/frames of the face of the person inside the vehicle using a face embedding machine learning model 320. The face embedding machine learning model 165 used by the cloud 160 and the face embedding machine learning model 320 used by the edge device 110 may be the same or similar machine learning model. For example, they may both be deployed using the same model artifacts 340 stored in the cloud 160. The edge device 110 may compare the face embedding of the person inside the vehicle to the face embedding of the authorized person that is expected to be inside the vehicle using a face verification machine learning model 310. The edge device 110 may generate a match indicator indicating whether the faces match or not (or indicating how closely the faces match). The edge device 110 may use the match indicator (e.g., as one factor) to determine whether to trigger a security alert, as described above.

Figures 4, 5:
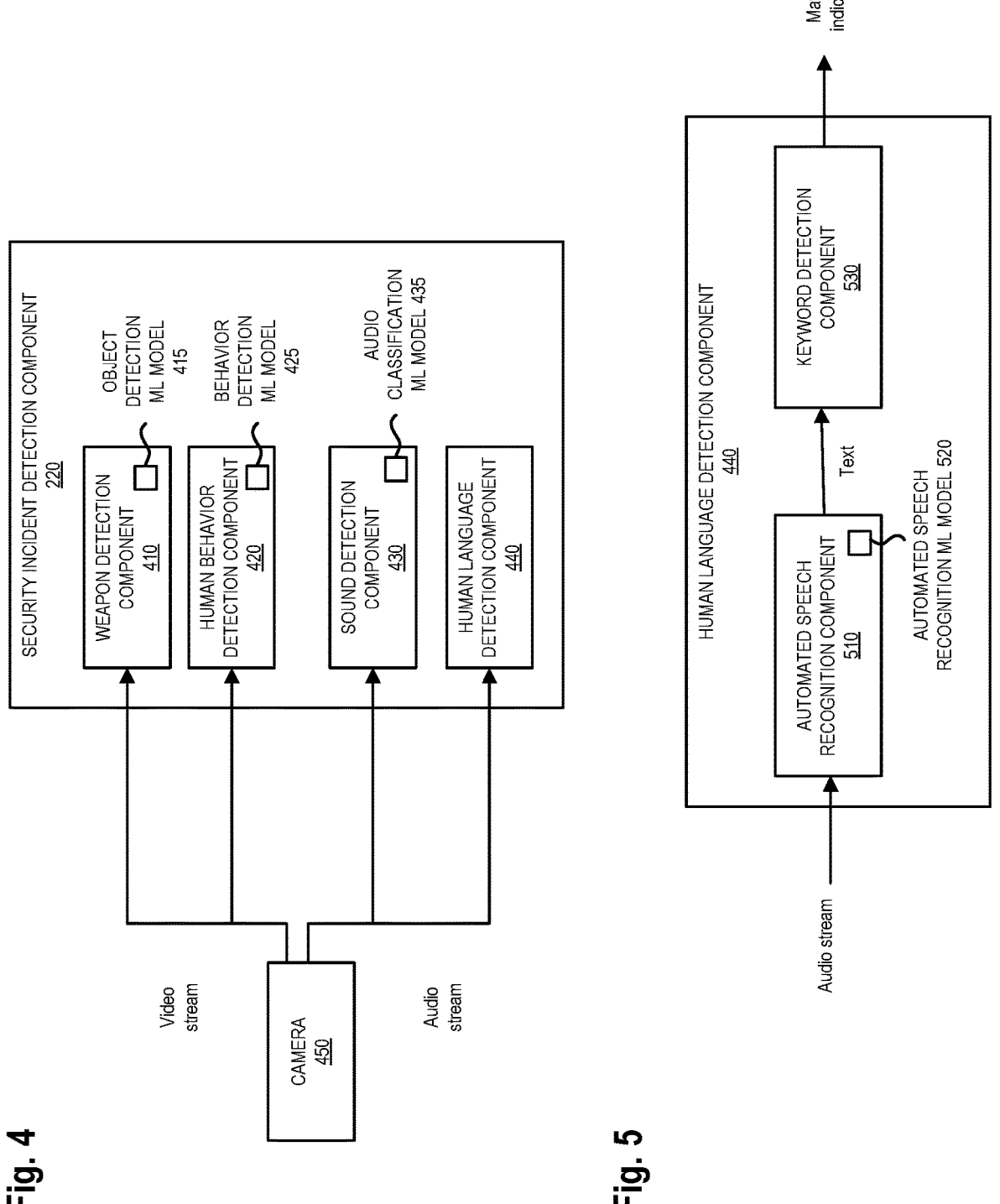
FIG. 4 is a diagram showing subcomponents of a security incident detection component, according to some embodiments.
FIG. 5 is a diagram showing subcomponents of a human language detection component, according to some embodiments.

FIG. 4 is a diagram showing subcomponents of a security incident detection component, according to some embodiments.

As shown in the diagram, the security incident detection component 220 includes a weapon detection component 410, a human behavior detection component 420, a sound detection component 430, and a human language detection component 440. A camera 450 (of an edge device) may capture and provide a video stream to the weapon detection component 410 and the human behavior detection component 420. The camera 450 may also capture and provide an audio stream to the sound detection component 430 and the human language detection component 440.

The weapon detection component 410 may include an object detection machine learning model 415. The weapon detection component 410 may use the object detection machine learning model 415 to detect weapons appearing in the video stream. In an embodiment, the object detection machine learning model 415 is trained using an open dataset. The human behavior detection component 420 may include a behavior detection machine learning model 425. The human behavior detection component 420 may use the behavior detection machine learning model 425 to detect human behavior indicative of a security incident appearing in the video stream. The sound detection component 430 may include an audio classification machine learning model 435. The sound detection component 430 may use the audio classification machine learning model 435 to detect sounds indicative of a security incident heard in the audio stream. As will be described in additional detail with reference to FIG. 5, the human language detection component 440 may detect human language that is indicative of a security incident heard in the audio stream. It should be appreciated that the security incident detection component 220 may use other types of inputs, where available, to detect security incidents (e.g., inertial measurement unit (IMU) input, on-board diagnostic (OBD) input, etc.).

FIG. 5 is a diagram showing subcomponents of a human language detection component, according to some embodiments.

As shown in the diagram, the human language detection component 440 includes an automated speech recognition component 510 and a keyword detection component 530. The automated speech recognition component 510 includes an automated speech recognition machine learning model 520. The automated speech recognition component 510 may use the automated speech recognition machine learning model 520 to convert an audio stream into text (e.g., perform speech-to-text). The automated speech recognition component 510 may provide the resulting text to the keyword detection component 530. The keyword detection component 530 may analyze the text (e.g., using a suitable keyword matching algorithm) to determine whether any keywords or phrases indicative of a security incident appear in the text. The keyword detection component 530 may generate a match indicator indicating whether the keywords and/or phrases detected in the text.

Figure 6:
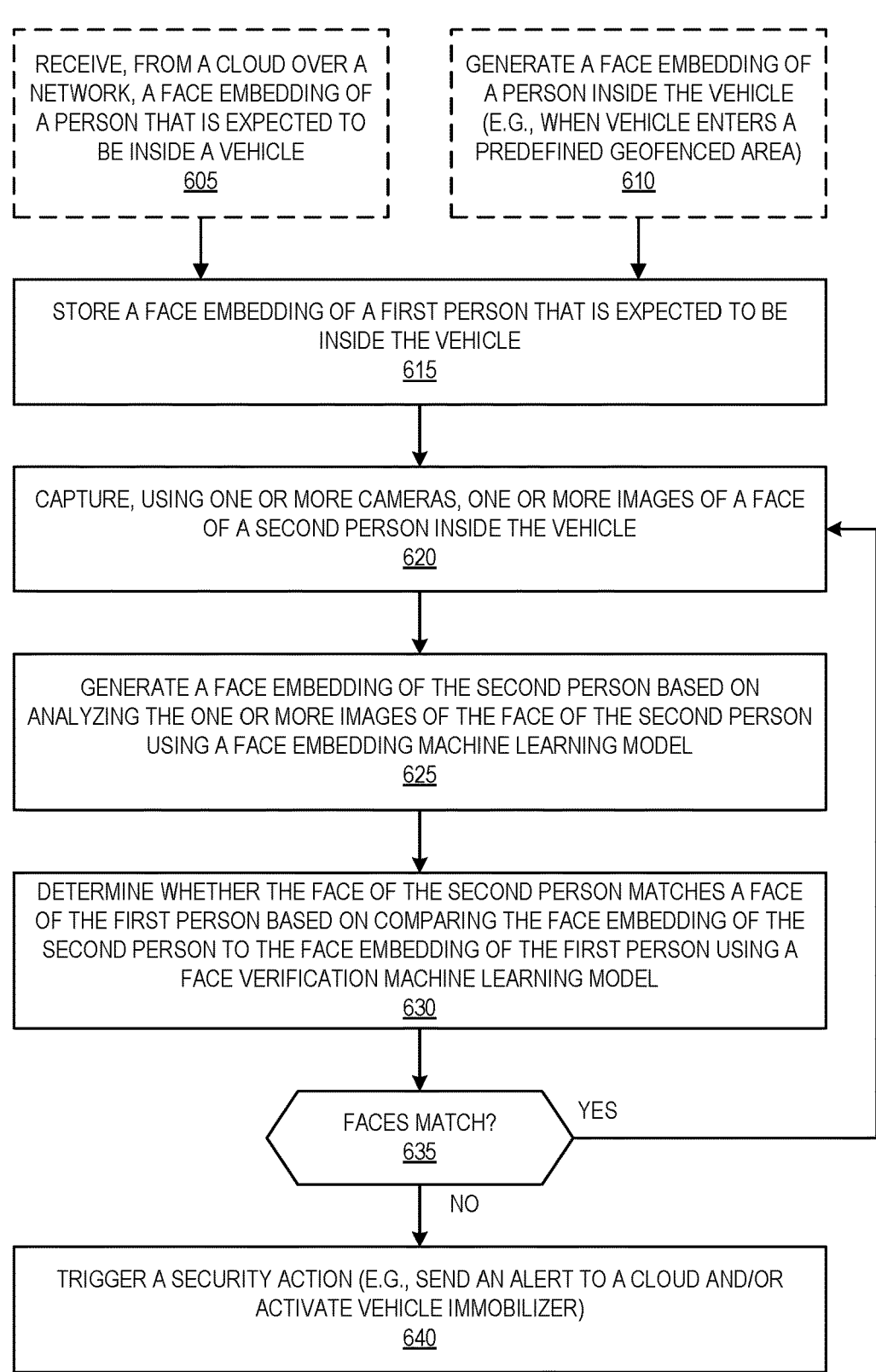
FIG. 6 is a flow diagram of a method for using artificial intelligence in an edge device to automatically trigger a security action, according to some embodiments.

FIG. 6 is a flow diagram of a method for using artificial intelligence in an edge device to automatically trigger a security action, according to some embodiments. The method may be performed by an edge device installed in/on a vehicle.

The operations in the flow diagrams will be described with reference to the example embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

In an embodiment, at operation 605, the edge device receives, from a cloud over a network, a face embedding of a person that is expected/authorized to be inside the vehicle. Alternatively, in an embodiment, at operation 610, the edge device generates a face embedding of a person inside the vehicle (locally generates the face embedding). For example, the edge device may generate the face embedding of the person inside the vehicle based on capturing, using one or more cameras, one or more images/frames of the face of the person inside the vehicle and analyzing the one or more images using a face embedding machine learning model. In an embodiment, the edge device generates the face embedding of the person inside the vehicle when the vehicle enters a predefined geofenced area.

At operation 615, the edge device stores a face embedding of a first person that is expected to be inside the vehicle. The first person may be the person referenced in operation 605 or operation 610.

At operation 620, the edge device captures, using one or more cameras, one or more images/frames of a face of a second person inside the vehicle. The second person is the person that is actually inside the vehicle. As will be seen from the descriptions provided herein below, the second person may be the same person as the first person or a different person from the first person.

At operation 625, the edge device generates a face embedding of the second person based on analyzing the one or more images of the second person using a face embedding machine learning model.

At operation 630, the edge device determines whether the face of the second person matches a face of the first person based on comparing the face embedding of the second person to the face embedding of the first person using a face verification machine learning model.

At operation 635, the edge device determines whether the faces match. If the faces match, then this means that second person (the person currently inside the vehicle) is the same as the person that is expected to be inside the vehicle, and thus the identity of the second person is successfully verified. In this case, the flow may return to operation 620 (e.g., to continually verify the identity of the person inside the vehicle).

Returning to operation 635, if the edge device determines that the faces do not match, then at operation 640, the edge device triggers a security action. For example, the edge device may send an alert to a cloud (to notify a fleet manager) and/or activate a vehicle immobilizer. In an embodiment, the security action (or particular security actions such as activating the vehicle immobilizer) is allowed to be triggered while the vehicle is within a predefined geofenced area but not allowed to be triggered when the vehicle is outside of a predefined geofenced area.

Figure 7:
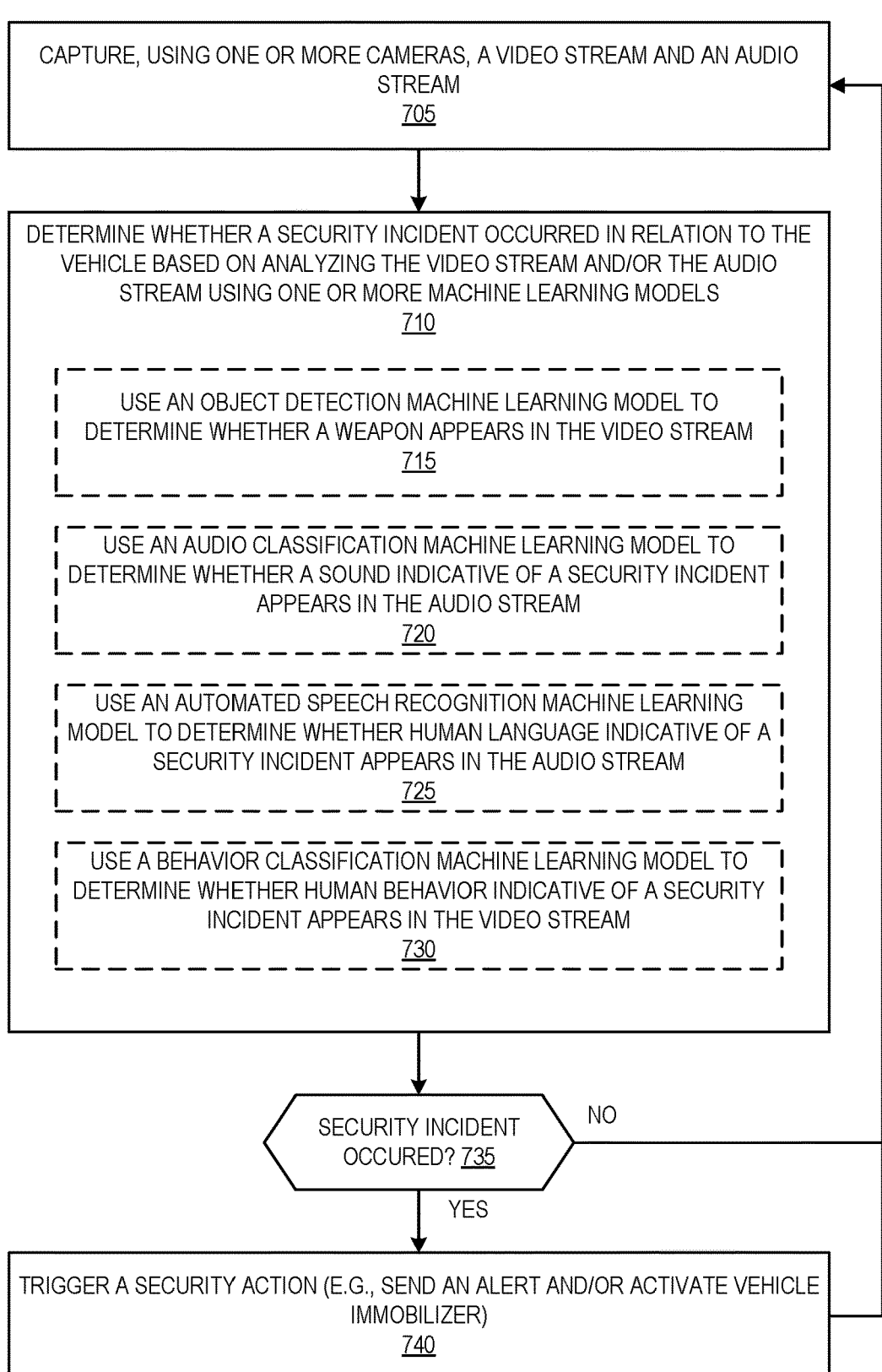
FIG. 7 is a flow diagram of another method for using artificial intelligence in an edge device to automatically trigger a security action, according to some embodiments.

FIG. 7 is a flow diagram of another method for using artificial intelligence in an edge device to automatically trigger a security action, according to some embodiments. The method may be performed by an edge device installed in a vehicle.

At operation 705, the edge device captures, using one or more cameras, a video stream and an audio stream. In an embodiment, the video stream shows a view of a cabin of the vehicle as well as a view facing outward from the vehicle (as part of the same or separate video streams).

At operation 710, the edge device determines whether a security incident occurred in relation to the vehicle based on analyzing the video stream and/or the audio stream using one or more machine learning models. In an embodiment, operation 710 involves one or more of operation 715, operation 720, operation 725, and operation 730. At operation 715, the edge device uses an object detection machine learning model to determine whether a weapon appears in the video stream. At operation 720, the edge device uses an audio classification machine learning model to determine whether a sound indicative of a security incident is heard in the audio stream. At operation 725, the edge device uses an automated speech recognition machine learning model to determine whether human language indicative of a security incident is heard in the audio stream. At operation 730, the edge device uses a behavior classification machine learning model to determine whether human behavior indicative of a security incident appears in the video stream.

At operation 735, the edge device determines whether a security incident has occurred in relation to the vehicle (e.g., based on the events detected in the video stream and/or audio stream). If the edge device determines that a security incident has not occurred, the flow may proceed to operation 705 to capture and analyze an additional video stream and audio stream. Otherwise, if the edge device determines that a security incident has occurred, then at operation 740, the edge device triggers a security action. For example, the edge device may send an alert to a cloud (to notify a fleet manager) and/or activate a vehicle immobilizer. In an embodiment, the security action (or certain security actions such as activating the vehicle immobilizer) is allowed to be triggered while the vehicle is within a predefined geofenced area but not allowed to be triggered when the vehicle is outside of a predefined geofenced area.

In an embodiment, the method shown in FIG. 7 may be performed in addition to the method shown in FIG. 6. In an embodiment, the edge device determines whether to trigger a security action based on the result of performing identity verification and the result of performing security incident detection (e.g., the determination of whether to trigger a security action is determined based on a combination of the result of performing identity verification and the result of performing security incident detection). In an embodiment, the edge device receives, from a cloud over a network, a command to activate a vehicle immobilizer and activates the vehicle immobilizer in response to receiving the command.

Figure 8:
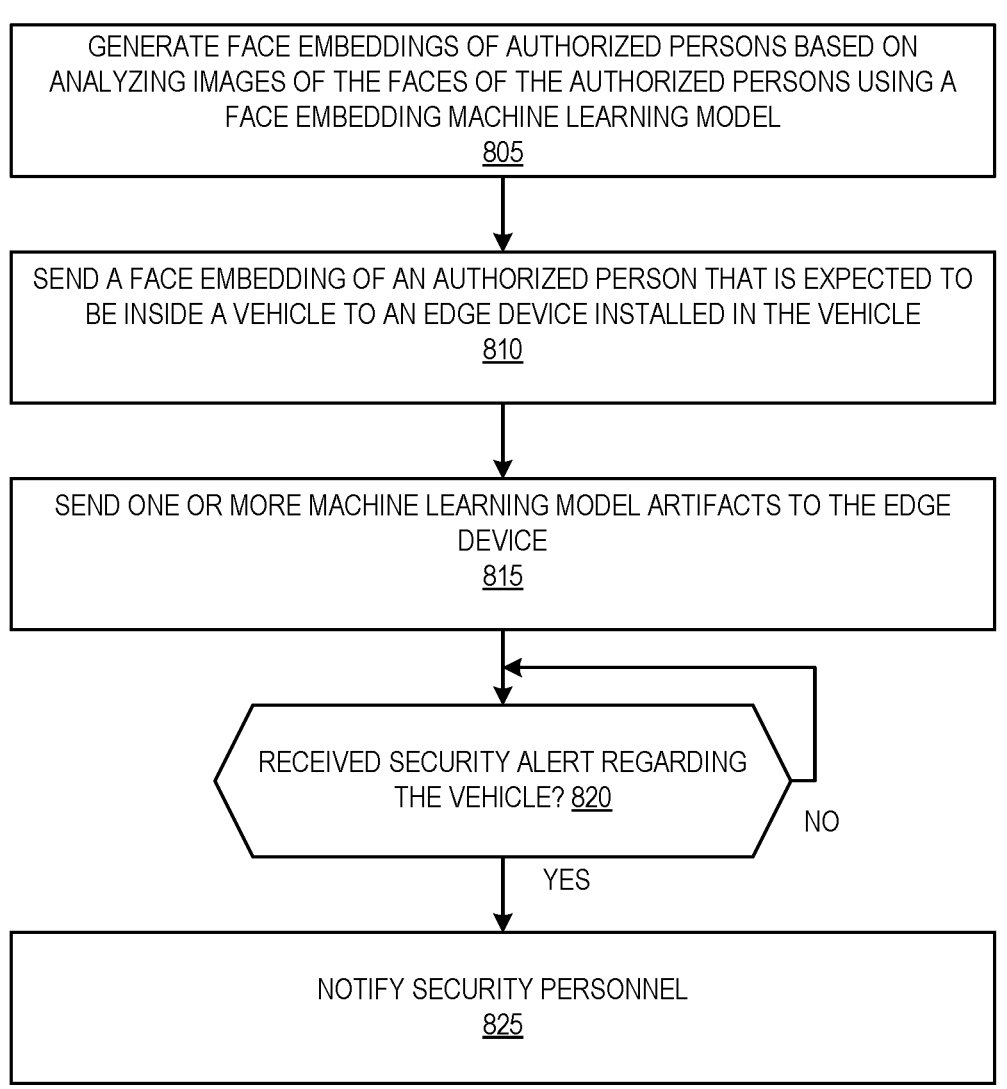
FIG. 8 is a flow diagram of a method for supporting the use of artificial intelligence in an edge device to automatically trigger a security action, according to some embodiments.

FIG. 8 is a flow diagram of a method for supporting the use of artificial intelligence in an edge device to automatically trigger a security action, according to some embodiments. The method may be performed by one or more computing devices of a cloud (e.g., implementing fleet management software) that is connected to an edge device installed in a vehicle over a network.

At operation 805, the cloud generates face embeddings of authorized persons based on analyzing images of the faces of the authorized persons using a face embedding machine learning model.

At operation 810, the cloud sends a face embedding of an authorized person that is expected to be inside the vehicle to the edge device installed in the vehicle.

At operation 815, the cloud sends one or more machine learning artifacts to the edge device (which can be used to deploy machine learning models in the edge device such as the various machine learning models mentioned above).

At operation 820, the cloud determines whether it received a security alert regarding the vehicle from the edge device. If not, then the cloud may wait until a security alert regarding the vehicle is received. If the cloud determines that it received a security alert regarding the vehicle, at operation 825, the cloud notifies appropriate security personnel (e.g., a user of the fleet management software such as a fleet manager).

Figure 9:
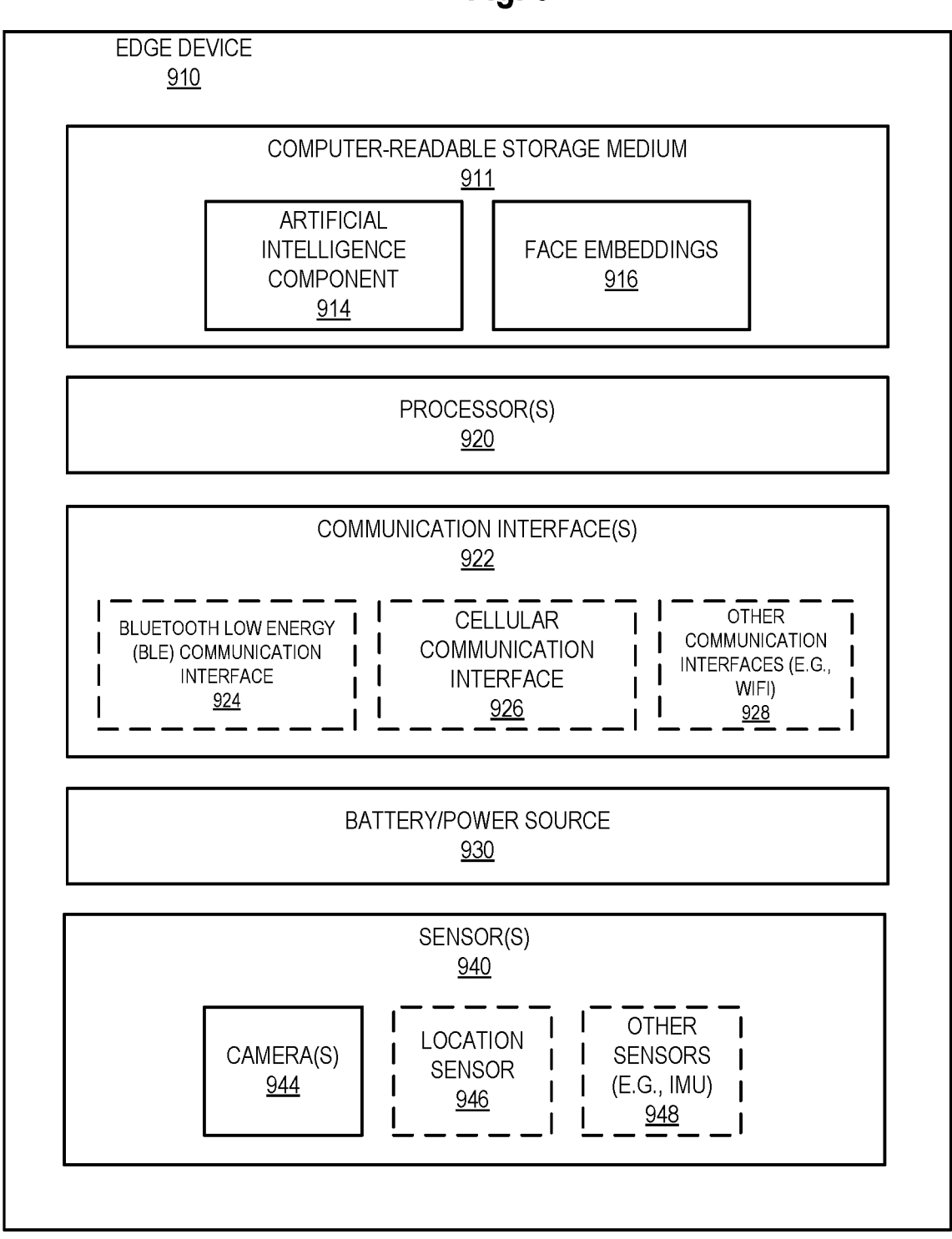
FIG. 9 is a block diagram showing an edge device, according to some embodiments.

FIG. 9 is a block diagram showing an edge device, according to some embodiments.

As shown in the diagram, the edge device 910 includes a computer-readable storage medium 911 (e.g., a non-transitory computer-readable storage medium). The computer-readable storage medium 911 may be coupled to processor(s) 920. The computer-readable storage medium 911 may be used for storing data, metadata, and programs for execution by the processor(s) 920. For example, the depicted computer-readable storage medium 911 may store an artificial intelligence component 914 that, when executed by the processor(s) 920, causes the edge device 910 to perform operations that leverage artificial intelligence to automatically trigger a security action, as described herein. The artificial intelligence component 914 may use one or more machine learning models to perform identity verification and/or to detect when a security incident has occurred, as described herein above. While the artificial intelligence component 914 is shown as code/instructions stored on the computer-readable storage medium 911, in other embodiments this component may be implemented in hardware or in a combination of hardware and software. The computer-readable storage medium 911 may also store face embeddings 916 that the artificial intelligence component 914 can use to verify the identity of persons inside a vehicle, as described herein above.

The edge device 910 also includes communication interface(s) 922, which allow the edge device 910 to communicate with other devices. In an embodiment, the communication interface(s) 922 include a BLE communication interface 924, a cellular communication interface 926 (e.g., a 2G, 3G, 4G Long Term Evolution (LTE), or 5G communication interface), and/or other types of communication interfaces such as a Wi-Fi communication interface (e.g., an interface that is compatible with IEEE 802.11 Wi-Fi standards). In an embodiment, the edge device 910 uses one or more communication interface(s) to connect to a gateway. In an embodiment, the connection to the gateway is a wired connection. The edge device 910 may communicate with a cloud over a network (e.g., the internet) via the gateway.

The edge device 910 also includes a battery or other type of power source 930. In an embodiment, the edge device 910 is connected to a gateway using a wired connection and receives power from the gateway.

The edge device 910 also includes sensor(s) 940. The sensor(s) may include camera(s) 944 (e.g., an inward facing camera and/or an outward facing camera if the edge device 910 is a dash cam), a location sensor 946 (e.g., a GPS sensor), and/or other sensors 948 (e.g., an inertial measurement unit (IMU) sensor).

It will be appreciated that one or more buses (not shown) may be used to interconnect the various components shown in FIG. 9. Also, it will be appreciated that additional components, not shown, may also be part of the edge device 910, and, in certain embodiments, fewer components than that shown in FIG. 9 may also be used in an edge device 910.

In the above description, numerous specific details are set forth in order to provide a more thorough understanding. It will be appreciated, however, by one skilled in the art, that the invention may be practiced without such specific details. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

In the description and claims, the term "coupled," along with its derivatives, may be used. "Coupled" is used to indicate that two or more elements, which may or may not be in direct physical or electrical contact with each other, co-operate or interact with each other.

An embodiment may be an article of manufacture in which a non-transitory machine-readable storage medium (such as microelectronic memory) has stored thereon instructions (e.g., computer code) which program one or more data processing components (generically referred to here as a "processor") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While the above description includes several example embodiments, those skilled in the art will recognize that the invention is not limited to the embodiments described and can be practiced with modification and alteration within the spirit and scope of the appended claims. The description should thus be regarded as illustrative instead of limiting.

What is claimed is:

1. A method performed by an edge device having one or more cameras, the method comprising:

responsive to determining that a vehicle is entering a predefined geofenced area, capturing, using the one or more cameras, one or more images of a face of a first person inside the vehicle and generating a face embedding of the first person based on analyzing the one or more images of the face of the first person using a face embedding machine learning model;

while the vehicle is within the predefined geofenced area, capturing, using the one or more cameras, one or more images of a face of a second person inside the vehicle;

generating a face embedding of the second person based on analyzing the one or more images of the face of the second person using the face embedding machine learning model;

determining whether a driver switch occurred within the predefined geofenced area based on comparing, using a face verification machine learning model, the face embedding of the second person to the face embedding of the first person that was generated when the vehicle entered the predefined geofenced area; and triggering a first security action in response to determining that the driver switch occurred within the predefined geofenced area, wherein the driver switch is determined to have occurred because the comparison indicates that the face of the second person does not match the face of the first person.

2. The method of claim 1, wherein the first security action is allowed to be triggered while the vehicle is within the predefined geofenced area but not allowed to be triggered when the vehicle is outside of the predefined geofenced area.

3. The method of claim 1, wherein the first security action includes one or both of: sending an alert to a cloud over a network and activating a vehicle immobilizer.

4. The method of claim 1, further comprising:

capturing, using the one or more cameras, a video stream and an audio stream;

determining whether a security incident occurred in relation to the vehicle based on analyzing the video stream and/or the audio stream using one or more machine learning models; and triggering a second security action in response to determining that the security incident occurred.

5. The method of claim 4, wherein determining whether the security incident occurred comprises using an object detection machine learning model to determine whether a weapon appears in the video stream.

6. The method of claim 4, wherein determining whether the security incident occurred comprises using an audio classification machine learning model to determine whether a sound indicative of a security incident is heard in the audio stream.

7. The method of claim 4, wherein determining whether the security incident occurred comprises using an automated speech recognition machine learning model to determine whether human language indicative of a security incident is heard in the audio stream.

8. The method of claim 4, wherein determining whether the security incident occurred comprises using a behavior classification machine learning model to determine whether human behavior indicative of a security incident appears in the video stream.

9. The method of claim 4, wherein the second security action includes one or both of: sending an alert to a cloud over a network and activating a vehicle immobilizer.

10. The method of claim 9, wherein the vehicle immobilizer is allowed to be activated while the vehicle is within the predefined geofenced area but not allowed to be activated when the vehicle is outside of the predefined geofenced area.

11. The method of claim 4, wherein the video stream shows a view of a cabin of the vehicle and a view facing outward from the vehicle.

12. The method of claim 1, further comprising:

receiving, from a cloud over a network, a command to activate a vehicle immobilizer; and activating the vehicle immobilizer in response to receiving the command to cause the vehicle to be immobilized.

13. A non-transitory machine-readable medium having instructions stored therein, which when executed by one or more processors of an edge device having one or more cameras, causes the edge device to perform operations comprising:

responsive to determining that a vehicle is entering a predefined geofenced area, capturing, using the one or more cameras, one or more images of a face of a first person inside the vehicle and generating a face embedding of the first person based on analyzing the one or more images of the face of the first person using a face embedding machine learning model;

while the vehicle is within the predefined geofenced area, capturing, using the one or more cameras, one or more images of a face of a second person inside the vehicle;

generating a face embedding of the second person based on analyzing the one or more images of the face of the second person using the face embedding machine learning model;

determining whether a driver switch occurred within the predefined geofenced area based on comparing, using a face verification machine learning model, the face embedding of the second person to the face embedding of the first person that was generated when the vehicle entered the predefined geofenced area; and triggering a first security action in response to determining that the driver switch occurred within the predefined geofenced area, wherein the driver switch is determined to have occurred because the comparison indicates that the face of the second person does not match the face of the first person.

14. The non-transitory machine-readable medium of claim 13, wherein the operations further comprise:

capturing, using the one or more cameras, a video stream and an audio stream;

determining whether a security incident occurred in relation to the vehicle based on analyzing the video stream and/or the audio stream using one or more machine learning models; and triggering a second security action in response to determining that the security incident occurred.

15. An edge device comprising:
one or more cameras;
one or more processors; and
a non-transitory computer-readable storage medium storing instructions, which when executed by the one or more processors, causes the edge device to:

responsive to determining that a vehicle is entering a predefined geofenced area, capture, using the one or more cameras, one or more images of a face of a first person inside the vehicle and generating a face embedding of the first person based on analyzing the one or more images of the face of the first person using a face embedding machine learning model, while the vehicle is within the predefined geofenced area, capture, using the one or more cameras, one or more images of a face of a second person inside the vehicle, generate a face embedding of the second person based on analyzing the one or more images of the face of the second person using the face embedding machine learning model, determine whether a driver switch occurred within the predefined geofenced area based on comparing, using a face verification machine learning model, the face embedding of the second person to the face embedding of the first person that was generated when the vehicle entered the predefined geofenced area, and trigger a first security action in response to determining that the driver switch occurred within the predefined geofenced area, wherein the driver switch is determined to have occurred because the comparison indicates that the face of the second person does not match the face of the first person.

16. The edge device of claim 15, wherein the instructions, when executed by the one or more processors, further causes the edge device to:

capture, using the one or more cameras, a video stream and an audio stream, determine whether a security incident occurred in relation to the vehicle based on analyzing the video stream and/or the audio stream using one or more machine learning models, and trigger a second security action in response to determining that the security incident occurred.

17. The edge device of claim 15, wherein the edge device is a dash camera.

* * * * *